US008106277B2

(12) United States Patent
Barnett et al.

(10) Patent No.: US 8,106,277 B2
(45) Date of Patent: Jan. 31, 2012

(54) SOUND GENERATING INSTRUMENT

(76) Inventors: Ronald J Barnett, Santa Rosa, CA (US); Gregory W Cherry, Sebastopol, CA (US); Michio Furukawa, Rohnert Park, CA (US)

( * ) Notice: Subject to any disclaimer, the term of this patent is extended or adjusted under 35 U.S.C. 154(b) by 0 days.

(21) Appl. No.: 13/024,645

(22) Filed: Feb. 10, 2011

(65) Prior Publication Data

US 2011/0126692 A1 Jun. 2, 2011

Related U.S. Application Data

(63) Continuation of application No. 11/198,547, filed on Aug. 4, 2005, now abandoned.

(60) Provisional application No. 60/600,151, filed on Aug. 6, 2004.

(51) Int. Cl.
*G01D 13/08* (2006.01)

(52) U.S. Cl. ................................ 84/404; 84/413; 84/421

(58) Field of Classification Search .................. 52/80.1, 52/146, 148; 84/404, 1, 413, 421, 403, 406, 84/402; 116/141, 169
See application file for complete search history.

(56) References Cited

U.S. PATENT DOCUMENTS

| | | | | |
|---|---|---|---|---|
| 3,063,521 | A | 11/1962 | Fuller | |
| 3,589,233 | A * | 6/1971 | Rowe, Sr. | 84/402 |
| 4,148,520 | A | 4/1979 | Miller | |
| 4,469,003 | A * | 9/1984 | Phelps | 84/404 |
| 5,309,809 | A * | 5/1994 | Sambuchi | 84/404 |
| D349,619 | S * | 8/1994 | Li | D6/499 |
| 5,648,624 | A * | 7/1997 | Smith | 84/404 |
| 5,831,516 | A * | 11/1998 | Jennings | 340/392.4 |
| 6,112,382 | A * | 9/2000 | Parker et al. | 27/1 |
| 6,559,367 | B1 * | 5/2003 | Yiu | 84/405 |
| 7,013,608 | B2 * | 3/2006 | Newland | 52/146 |
| 2003/0009974 | A1 | 1/2003 | Liapi | |

* cited by examiner

*Primary Examiner* — Eileen D Lillis
*Assistant Examiner* — Chi Nguyen
(74) *Attorney, Agent, or Firm* — Bay Area Technology Law Group PC

(57) ABSTRACT

A sound generating instrument having at least three resonant struts, each resonant strut having a length, terminal ends, longitudinal axis along said length and cross section. At least nine tension elements are provided causing the resonant struts to be compressively connected to other resonant struts by attachment of the tension elements at at least two points along the longitudinal axis of each resonant strut. A striker element is provided for selectively contacting the resonant struts for generating sound.

20 Claims, 5 Drawing Sheets

SOUND GENERATING INSTRUMENT

RELATED U.S. APPLICATION DATA

The present application is a continuation of U.S. application Ser. No. 11/198,547 filed on Aug. 4, 2005 based upon provisional Application Ser. No. 60/600,151 filed on Aug. 6, 2004.

TECHNICAL FIELD

The present invention relates to sound generation in which a striker element is caused to selectively contact one or more resonant struts. The sound generating instrument is formed as a tensegrity structure having at least three resonant struts and at least nine tension elements which, when used in combination, cause the resonant struts to be compressively connected to one another.

BACKGROUND OF THE INVENTION

Tensegrity or tensional integrity is a type of structure with an integrity based upon a balance between tension and compression components. In a tensegrity structure, the compressive members are connected to each other by tensile members. Thus, tensegrity structures are structures based on the combination of certain distinct principles. Specifically, loading members are only in pure compression or pure tension. Thus, such a structure will fail only if its cables yield or rods buckle. Mechanical stability is achieved as members remain in tension/compression as stress on such structure increases. As such, the literature is replete with instances in which stable structures are created using this principal.

There are a plethora of musical instruments which create sound through the striking of various rods, bars or tubes relying upon the vibration of these elements as sound generators. An excellent example is the xylophone, a prominent member of the percussion family having its origins in Africa and Asia. The instrument consists of bars, commonly made of wood, of various lengths that are struck by plastic, wooden or rubber mallets. Each bar is tuned to a specific pitch of the musical scale.

Another sound generating instrument somewhat related to the xylophone in that it also consists of elongated members which are struck to create sound is the wind chime. Typically, wind chimes are constructed from suspended tubes, rods or other objects and are often made of metal or wood. The chimes are hung from an overhead support and include a center ball or striker positioned at the center of the chime's length. The frequency is determined by the length, width, thickness and material of the chimes. There are formulas that help predict the proper length to achieve a particular note. The centrally located ball is generally called a "clapper" which contacts the suspended tubes or rods as wind passing by the chimes to induce contact.

There are many other examples of musical instruments that rely upon resonating elements to create sound. Such examples include the strings of a piano, the hollow tube of a trumpet and the sound box of a violin. The strings of an acoustic guitar vibrate as a result of a user's fingers or picks plucked against them noting that the bridge and ported hollow guitar body and body surface create a "coupling transducer" which couples energy from the resonating strings to free air creating sound discernable by a listener. However, musical instruments, like the xylophone, use the surface of its resonators as "coupling transducers." Such elements exhibit two basic resonant modes, a transverse mode in which the transducers' resonant motion is displaced orthogonally to the direction of a wave traveling along the axis of it and a longitudinal mode where resonant motion is displaced in the direction of a wave traveling along the axis of it. Resonants of the musical instruments made a part of the present invention are of transverse modes.

It has been found that a musical instrument of a tensegrity structure is capable of dampening unpleasant modes resulting in a pure sound which is more pleasing than corresponding musical instruments of the prior art.

It is thus an object of the present invention to provide a tensegrity musical instrument which is improved over corresponding musical instruments of the prior art. These and further objects will be more readily apparent when considering the following disclosure and appended claims.

SUMMARY OF THE INVENTION

A sound generating instrument having at least three resonant struts, each resonant strut having a length, terminal ends, longitudinal axis along said length and cross section. At least nine tension elements are provided causing the resonant struts to be compressively connected to other resonant struts by attachment of the tension elements at at least two points along the longitudinal axis of each resonant strut. A striker element is provided for selectively contacting the resonant struts for generating sound.

DETAILED DESCRIPTION OF THE INVENTION

Figure 1:
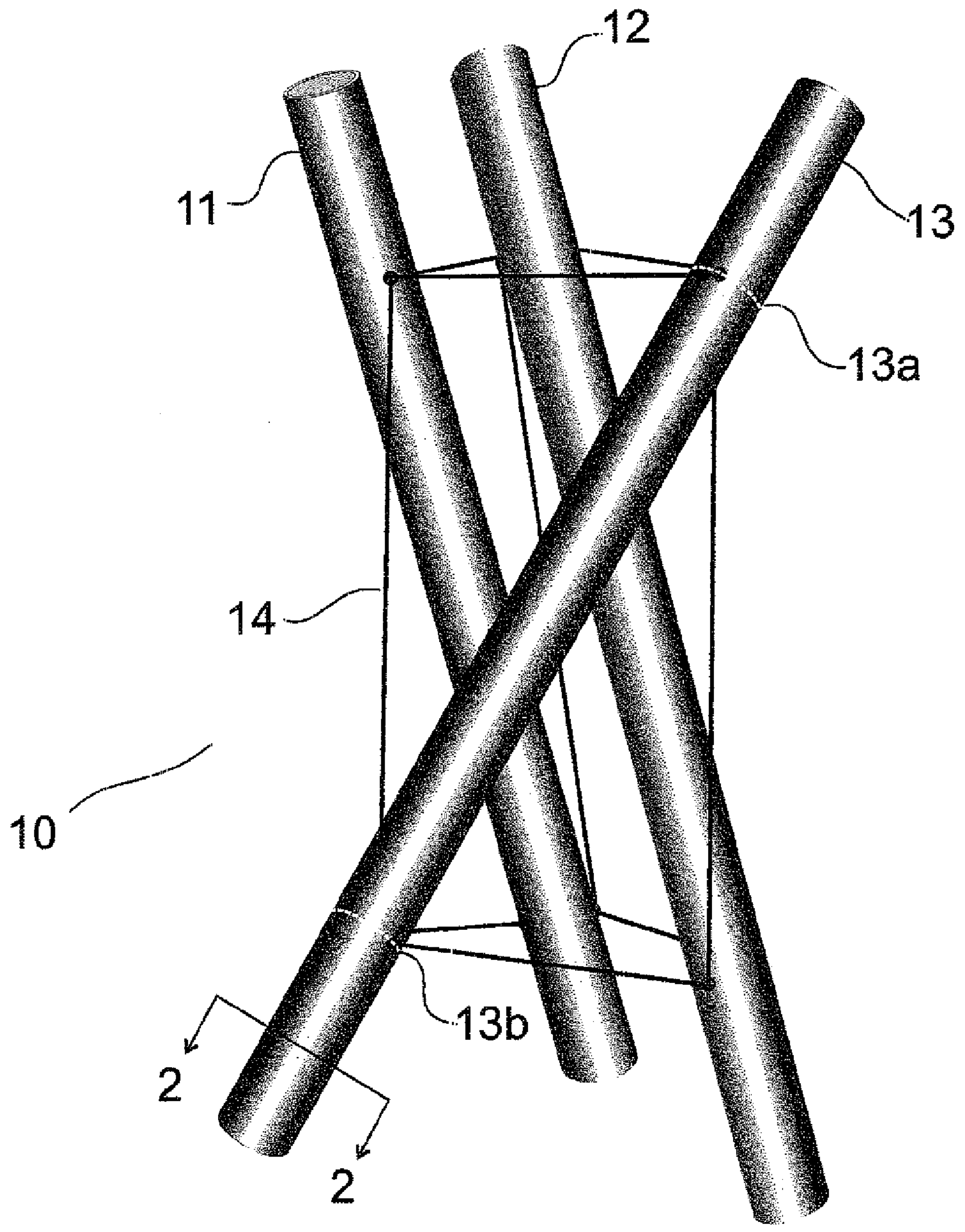
FIG. 1 is a perspective view of the basic elements constituting the present invention.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

Reference is made to FIG. 1 depicting the basic elements of the sound generating instrument of the present invention. Specifically, instrument 10 comprises at least three resonant struts 11, 12 and 13 being compressively connected to other resonant struts by attachment of tension elements 14 to at least two points 13A and 13B along the longitudinal axis of each resonant strut as will be more fully discussed below. The resonant struts can be of equal length or, for certain desired acoustic effects, resonant struts 11, 12 and/or 13 can be of unequal lengths.

Figure 3:
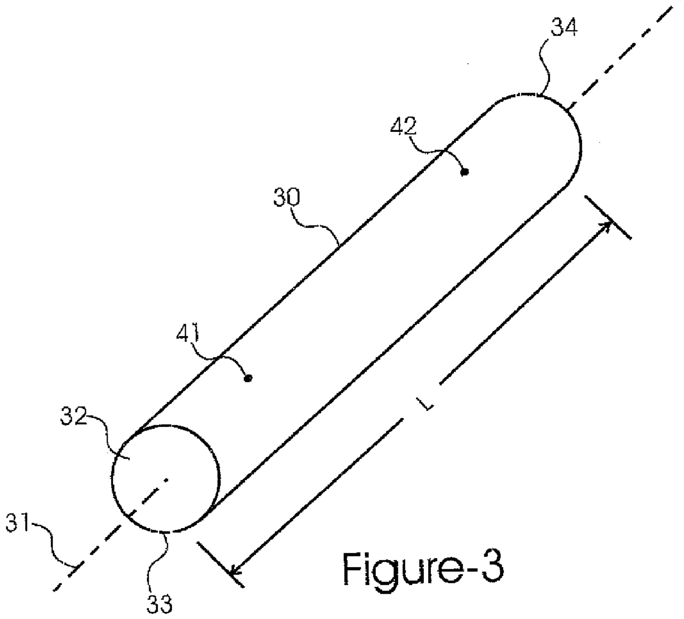
FIG. 3 is a perspective view of a resonant strut typical of resonant struts that can be employed in the present invention.

In reference to FIG. 3, each resonant strut 30 is provided with a length L, longitudinal axis 31, ends 33 and 34 and cross section 32.

Figure 2A:
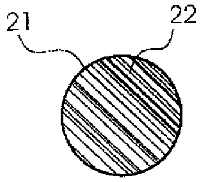
FIG. 2A-2F are cross sectional views of various resonant struts that can be employed in the present invention.
Figure 2B:
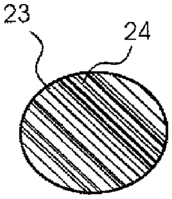
Figure 2C:
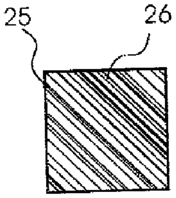
Figure 2D:
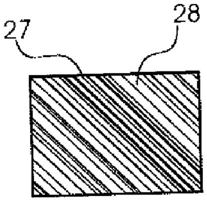
Figure 2E:
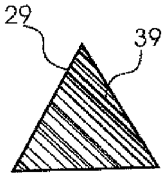
Figure 2F:
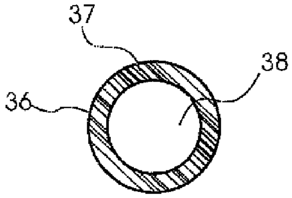

In reference to FIG. 2A, resonant strut 21 is shown to have a circular cross section 22. In reference to FIG. 2B, resonant strut 23 is of an oval cross section 24. In reference to FIG. 2C, resonant strut 25 has a square cross section 26. In reference to FIG. 2D, resonant strut 27 has a rectangular cross section 28 and in reference to FIG. 2E, resonant strut 29 has a triangular cross section 39. As examples, all of resonant struts 21, 23, 25, 27 and 29 are depicted as being in the form of solid rods. However, as noted in FIG. 2F, all resonant struts, in this instance, resonant strut 36, can be provided with side wall 37 creating open region 38. This provides for a hollow or tubular member which can be applied to each of the geometries of FIGS. 2A through 2E.

A feature of the present invention is the recognition of the appropriate connection points 13A and 13B along the longitudinal axis of each resonant element. These are shown in FIG. 3 as points 41 and 42. Points 41 and 42 are at the two nodal minima points on each resonant element. Simply stated, the nodal minima points are approximately 0.224 times the length of the resonant strut measured along longitudinal axis 31 from the struts' ends. When a resonant strut is supported at two nodal minima points, each 0.224 times its length measured from each end, the resonant strut is free to be excited as the ends are free to "flap" in the air. The free resonances of a resonant strut creates overtones which come about due to the reinforcing reflections of such members. When the resonant struts are supported at their two nodal minima points, the ends of the resonant struts are forced to their nodal maxima such that the majority of resonant energy that this coupled to the air is now coupled to the resonant strut's three nodal maxima located at the center and two free ends thereof where the resonant struts exhibit maximum velocity and displacement.

It should also be noted that in keeping with the present invention, tension elements can be connected to resonant struts in additional locations beyond that described above. The free resonances of resonant struts create overtones which come about due to reinforcing reflections off the ends of each resonant strut. The fundamental resonance comes about when the round trip phase difference of a wave traveling from one end of the resonant strut and back again is 360 degrees. The overtones occur when the round trip difference is an integer representing multiples of 360 degrees. Thus, the first overtone is a 2×360 degrees and the second overtone is a 3×360 degrees and so forth. These overtones are nonharmonic. FIG. 1 depicts the present invention wherein the resonant struts are of the lowest order mode. This is the fundamental mode that is one wave length long having two nodal minima located about one quarter wave length from each of the resonant strut's ends. However, while keeping within the present invention, tension elements can be connected to resonant struts at the second overtone as well.

Noting that overtones of a resonating strut are non-harmonic, a chime, for example, hanging loosely from a single nodal minima, has many modes besides the fundamental mode, such that an unpleasant "clanking" tone can be created. These unpleasant, mathematically irrational overtones are heavily damped through the present invention in the creation of the tension/compression relationship between tension elements and resonant struts inherent in a tensegrity structure. For any mode to exist on a resonant strut it must be free to move transversely at all points along the resonant strut except at its nodal minima points. All modes on a resonant strut have different nodal minima points. Therefore, holding the struts at their fundamental nodal minimas dampen all such unpleasant modes. Thus, a resonant strut of the present invention which is struck sounds more pleasing than the sound produced from a standard chime. And, resonant struts of different lengths can be combined to create a chord such as the three note major cord of C,E&G.

Variations as described above are contemplated in keeping with the present invention. For example, resonant struts can be "cross-coupled" such that when one resonant strut in a set of resonant struts has been struck, other resonant struts of the musical instrument are sounded. The acoustic coupling between resonant struts can be designed into such a structure by attaching the resonant struts with tension elements slightly displaced from their nodal minimas. Such attachment allows vibratory energy to be coupled from strut to strut. The larger the attachment is off from nodal minimas, the larger the strut to strut coupling and the greater the strut resonator damping.

Figure 4:
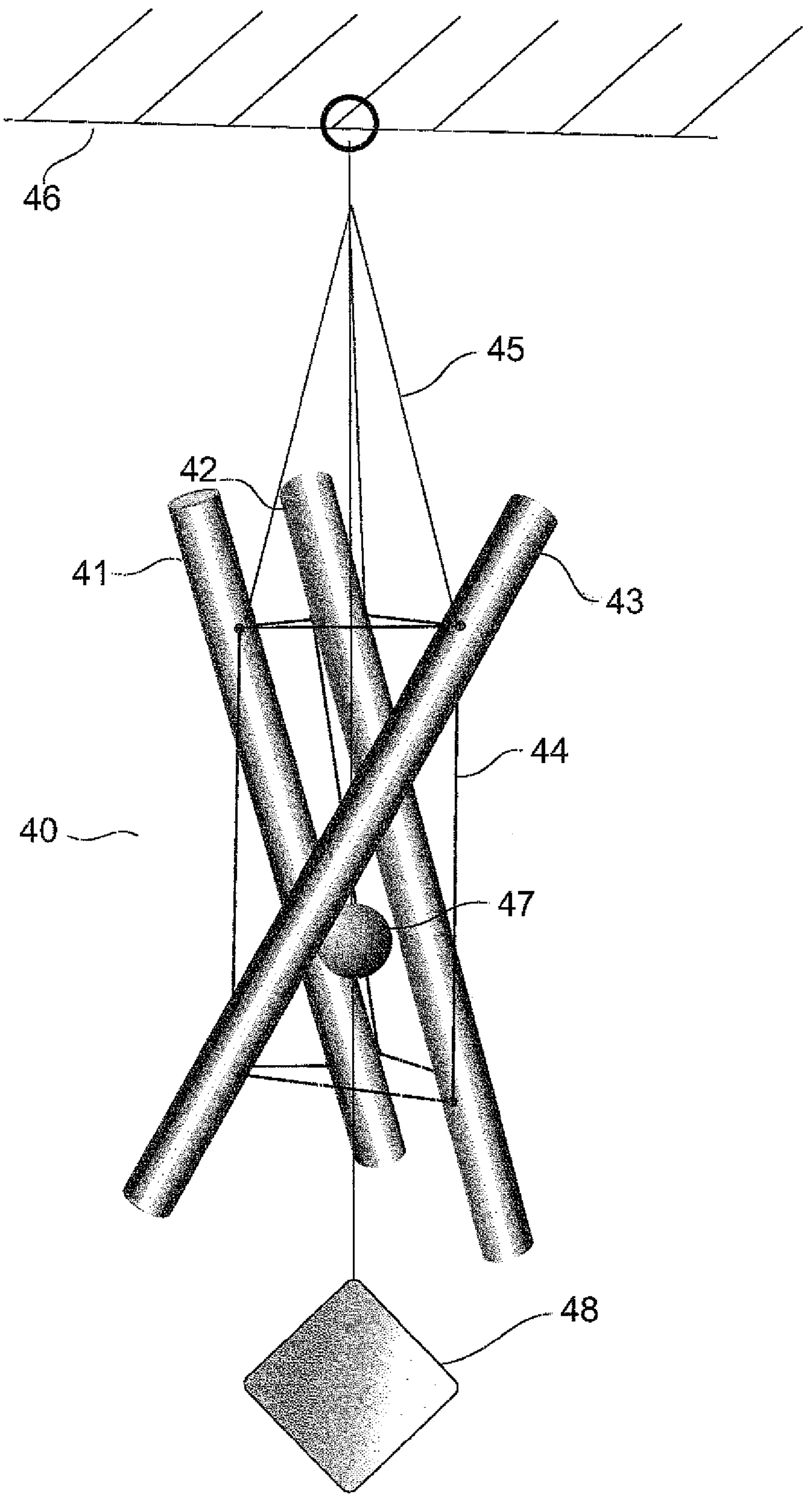
FIG. 4 is a perspective view of a wind chime constructed pursuant to the present invention.

Turning to FIG. 4, wind chime 40 is depicted constructed as a tensegrity structure whereby resonant struts 41, 42 and 43 are under compression through the use of tension elements 44. Resonant struts 41, 42 and 43 are suspended from overhead support 46 in an area where wind chime 40 is likely to be impacted by air moving with sufficient velocity to enable striker ball 47, used alone or in conjunction with clapper 48 to move causing its impact with resonant struts 41, 42 and 43 to create the desired sound energy.

Figure 5:
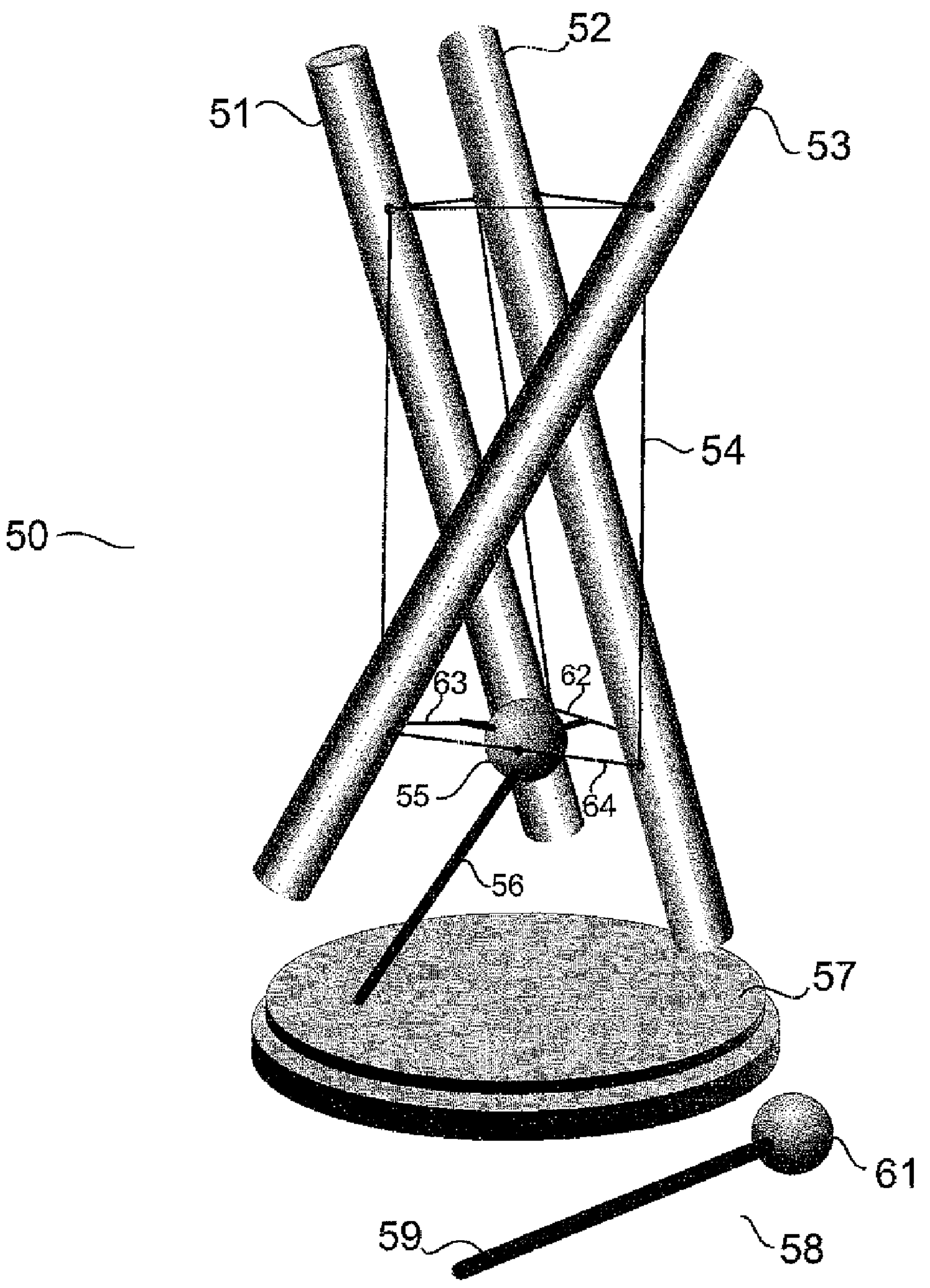
FIG. 5 is a base-supported musical instrument constructed pursuant to the present invention.

As yet a thither embodiment, reference is made to FIG. 5 depicting musical instrument 50. Specifically, resonant struts 51, 52 and 53 are held in compression through the use of tension elements 54. In this embodiment, thither tension elements 62, 63 and 64 are attached to support interface 55 which, in turn, is joined to base 57 by use of rigid member 56. Thus, resonant struts 51, 52 and 53 create a musical instrument on a base which can be placed on any support, ideally horizontal support, and which can be struck by mallet 58 having striking head 61 and handle 59.

Figure 6:
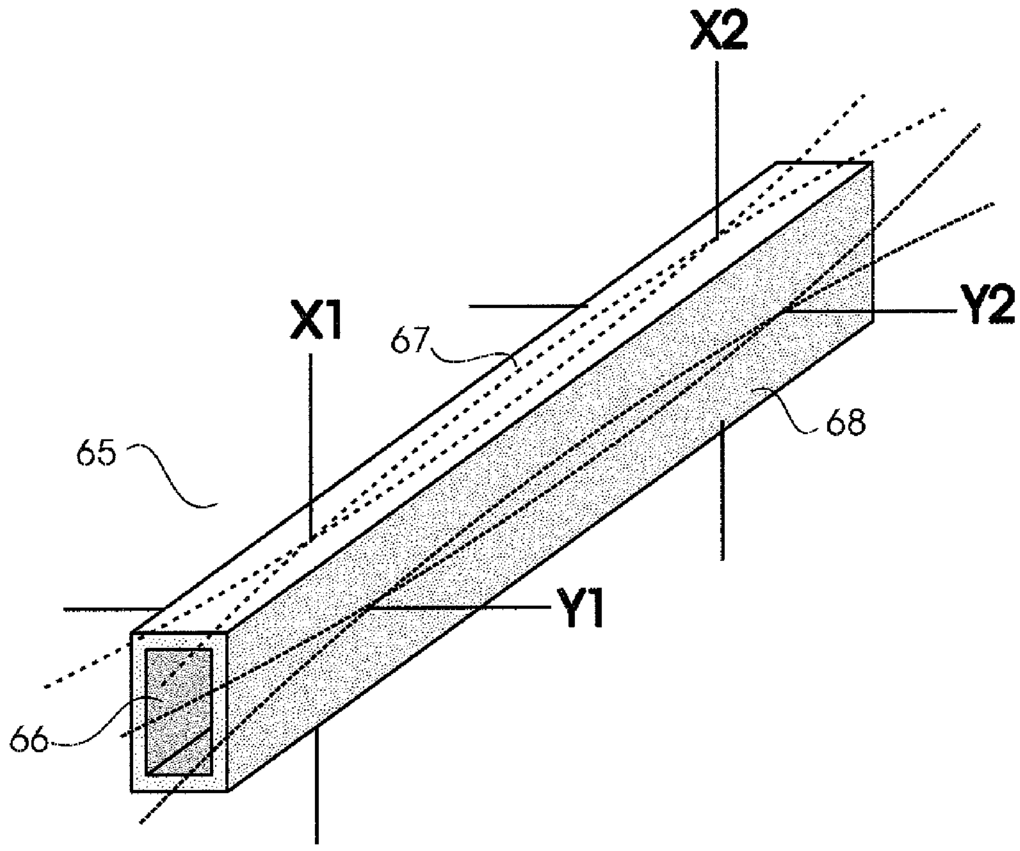
FIG. 6 is the perspective view of yet a further resonant strut of a rectangular cross section.

Yet a further embodiment of the present invention is illustrated in reference to FIG. 6. As noted in reference to FIGS. 2A-2F, the resonant struts of the present invention can be solid or hollow and have cross sections which have dimensions equally spaced from the longitudinal axis of the strut, examples being cross sections which are circular or square, all others have surfaces which are of contrasting differences, such as ovals and rectangles FIG. 6 is an illustration of a hollow resonant strut 65 of the latter category. This creates what is termed a “dual resonator” for creating two tones or notes from a single resonant strut. Resonant strut 65 is shown having a rectangular cross section 66. Different notes are created whether resonant strut 65 is struck along its short surface 67 or its longer surface 68 noting that a note of higher frequency will be created when resonant strut 65 is struck on surface 67 than if struck on surface 68.

Although the fundamental invention composed of three resonant struts has been depicted, the present invention contemplates the use of a higher number of such elements which may be redundant from a structural standpoint but which can serve the purpose of creating enhanced acoustic effects. Furthermore, redundant tension elements can be used connected to various resonant struts at points other than at the nodal minimas to assist in mulling or dampening the fundamental mode of the resonant struts while allowing, for example, their second overtone to be generated.

Such an embodiment highlights the advantages inherent in the present invention noting that a sound of pure quality can be created over a flee hanging instrument because of the ability of the present invention to suppress non-harmonic overtones.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

What is claimed is:

1. A sound generating instrument comprising at least three resonant struts, each resonant strut having a length, terminal ends, longitudinal axis along said length and cross section and at least nine tension elements, each resonant strut being compressively connected to other resonant struts by attachment of said tension elements at least two points along the longitudinal axis of each resonant strut and a striker element for selectively contacting said resonant struts.

2. The sound generating instrument of claim 1 wherein tension elements are attached along the longitudinal axis of each resonant strut at approximately 0.224 times said length measured from said ends thereof.

3. The sound generating instrument of claim 1 wherein said striker element is suspended proximate said resonant struts.

4. The sound generating element of claim 3 wherein said striker element moves by the passage of air traveling past said sound generating instrument.

5. The sound generating instrument of claim 1 wherein said striker element comprises a mallet having a handle sized for grasping by a user and a head portion for striking said resonant struts.

6. The sound generating instrument of claim 1 wherein said resonant struts are in the form of hollow tubular elements.

7. The sound generating instrument of claim 1 wherein said resonant struts comprise solid rods.

8. The sound generating instrument of claim 1 wherein said cross sections of said resonant struts are circular.

9. The sound generating instrument of claim 1 wherein said cross sections of said resonant struts are oval.

10. The sound generating instrument of claim 1 wherein said cross sections of said resonant struts are square.

11. The sound generating instrument of claim 1 wherein said cross sections of said resonant struts are rectangular.

12. The sound generating instrument of claim 1 wherein said cross sections of said resonant struts are triangular.

13. The sound generating instrument of claim 1 wherein said resonant struts are suspended by attachment of tension elements to a support above said resonant struts.

14. The sound generating instrument of claim 1 wherein at least one of said resonant struts is a dual resonator such that different tones are generated depending upon where said dual resonator is struck.

15. The sound generating instrument of claim 1 wherein at least one of said resonant strut is of different length than other resonant struts.

16. The sound generating instrument of claim 1 wherein said resonant struts are acoustically coupled to one another.

17. A wind chime instrument comprising at least three resonant struts, each resonant strut having a length, terminal ends, a longitudinal axis along said length and cross section and at least nine tension elements, each resonant strut being compressively connected to the other resonant struts and suspended from a support above said resonant struts by attachment of tension elements to said support and at least two points along the longitudinal axis of each resonant strut and a striker element also suspended from said support proximate said resonant struts.

18. The wind chime instrument of claim 17 wherein said tension elements are attached to said resonant struts along the longitudinal axis of each resonant strut at approximately 0.224 times the length of the resonant struts measured from said ends thereof.

19. A sound generating instrument comprising at least three resonant struts, each resonant strut having a length, terminal ends, a longitudinal axis along said length and cross section and at least nine tension elements, each resonant strut being compressively connected to other resonant struts by attachment of said tension elements at least two points along the longitudinal axis of each resonant strut and a striker element for selectively contacting said resonant struts and a base for supporting said resonant struts by connecting tension elements thereto.

20. The sound generating instrument of claim 19 wherein tension elements are attached along the longitudinal axis of each resonant strut at approximately 0.224 times said length measured from said ends thereof.

* * * * *